United States Patent [19]

Mashimo et al.

[11] 3,792,647

[45] Feb. 19, 1974

[54] ELECTRONIC SHUTTER DEVICE HAVING AN EXPOSURE METER CIRCUIT

[75] Inventors: Yukio Mashimo, Tokyo; Mutsunobu Yazaki; Mutsuhide Matsuda, both of Yokohama, all of Japan

[73] Assignee: Canon Kabushiki Kaisha, Tokyo, Japan

[22] Filed: June 13, 1972

[21] Appl. No.: 262,284

[30] Foreign Application Priority Data
June 15, 1971 Japan.............................. 46/42770

[52] U.S. Cl. ............................................ 95/10 CT
[51] Int. Cl. .............................................. G03b 7/08
[58] Field of Search.......... 95/10 CT, 10 CE, 10 CD

[56] References Cited
UNITED STATES PATENTS

| | | | |
|---|---|---|---|
| 3,286,610 | 11/1966 | Fahlenberg............................. | 95/10 |
| 3,547,018 | 12/1970 | Haberle................................. | 95/10 |
| 3,555,984 | 1/1971 | Rentschler............................. | 95/10 |

Primary Examiner—Samuel S. Matthews
Assistant Examiner—Michael L. Gellner
Attorney, Agent, or Firm—Toren and McGeady

[57] ABSTRACT

In a camera, a shutter with a shutter release iniates and terminates an exposure interval. A diaphragm controls the exposure intensity. Coupling means couple a capacitor to a pole of a power source through a photoelectric sensor that responds to the illumination of a scene being photographed in order to charge the capacitor at a rate determined by an electric value varied by the photoelectric sensor. Indicating means coupled to the photoelectric sensor and the power source establish the opening of the diaphragm. The shutter release opens a first switch connected in parallel with the capacitor so as to allow charging of the capacitor through the photoelectric sensor. Second switch means connect short-circuit forming means across the indicating means during flash photography. A variable resistive means whose value corresponds to the distance between the camera and the scene being photographed, is connected between the second switch means and another pole of the power source so that during flash operation the indicating means is connected with the variable resistive means. The second switch means connects the indicating means to the photoelectric means during ordinary daylight operation. The variable resistance means and the sensor respectively vary the changing rate of the capacitor for the flash and daylight operation of the camera. The shutter is closed when the charge on the capacitor reaches a predetermined value.

8 Claims, 3 Drawing Figures

ELECTRONIC SHUTTER DEVICE HAVING AN EXPOSURE METER CIRCUIT

The present invention relates to an electronic shutter device having an exposure meter circuit, and said device has a single light receiving element used both in an exposure meter circuit and in a timer circuit for a shutter.

Such an electronic shutter device that a single light receiving element is used both in an exposure meter cirucit and in a shutter timer circuit has previously been proposed. However, the conventional device is, as seen in the specification of the U.S. Pat. No. 3,286,610, to have a single light receiving element selectively connected with an exposure meter circuit or with a capacitor of a timer circuit by a change over switch, thus using the single light receiving element in both of the circuits in common.

Such a conventional device as mentioned above requires a change over switch, having such disadvantages that the device itself becomes complicated and its function becomes inaccurate.

The object of the present invention is to provide an electronic shutter device wherein the above-mentioned disadvantages are eliminated.

Examples of the present invention shall be explained referring to the attached drawings.

Figure 1:
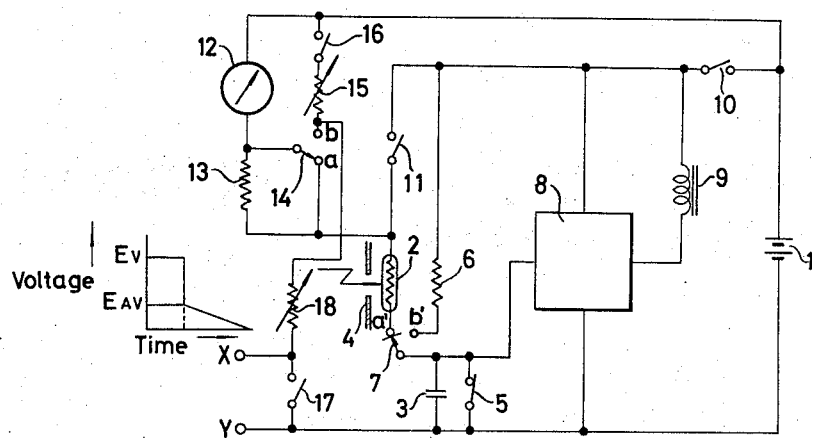
FIG. 1 is a circuit diagram showing the first example of the electronic shutter device of the present invention.

The circuit of FIG. 1 includes a power source 1, a light receiving element 2, and a capacitor 3. A timer circuit is composed of said light receiving element 2 and the capacitor 3. Element 4 is a diaphragm device provided in front of the light receiving element 2, varying its diaphragm diameter depending on photographing informations which have been set beforehand. Component 5 is a start switch and is opened in association with the opening of a shutter (not shown in the drawing) and is closed at the time of light sensing, etc. Elememt 6 is a resistance connected in parallel with the light receiving element, and is to be connected to the capacitor 3 simultaneously with the light receiving element 2 by a switch 7 at the time of flash photographing for limiting the shutter time. Component 8 is a switching circuit in the form of a Schmidt circuit, etc. and is to effect a switching function by the amount of electricity charged at the capacitor 3. Element 9 is a magnet connected to the output of the switching circuit 8, and is activated by the output from the switching circuit to close the shutter. Element 10 is a power source switch. Element 11 is a short-circuiting switch to place the exposure meter circuit which is to be described later in a short-circuited state. Said short-circuiting switch 11 may be so made that it is linked with a shutter release bar to close itself just before the shutter starts opening after completion of light sensing. Element 12 is an exposure meter. This exposure meter is connected in parallel with said short-circuiting switch 11. Element 13 is a compensating resistance to be described later. Element 14 is a switch to be changed over to an automatic photographing and to a flash photographing, and is preferably linked with the above-mentioned switch.

This change over switch 14 is, at the time of automatic photographing, connected to a contact "a" to place the resistance 13 in a short-circuited state and connecting the above-mentioned exposure meter 12 directly with the light receiving element 2. Further this change over switch is, at the time of flash photographing, connected to a contact "b", connecting the exposure meter 12 through the resistance 13, and connecting a film sensitivity setting resistance 15 to the exposure meter 12. Element 16 is a switch to be closed at the time of flash photography, and is preferably linked with the switches 7 and 14. Elements X, Y are terminals to enter a signal corresponding to the amount of illumination of an electronic flashing device into the exposure meter circuit. Hereinafter the electronic flash device shall be called as a single-purpose electronic flash device to distinguish it from an ordinary electronic flashing device. Element 17 is a switch and is to be opened when the single-purpose electronic flashing device is attached to the contacts X, Y. Component 18 is a resistance for setting distance, and is preferably linked with a distance setting member (not shown in the drawing) of a camera.

Next, an explanation shall be made on the functions of the device of the present invention. First for ordinary automatic photography, the linked switches 7, 14 are positioned as shown in the drawing.

When film sensitivity and diaphragm value are preset at a diaphragm device 4 and the light from an object is received by the photo-conductive element 2, electric current flows through the contact "a" of the switch 14 — the light receiving element 2 — the contact a' of the switch 7 — the switch 5 and to the ammeter 12 to have such swing angle as corresponding to the amount of light received by the light receiving element 2. Shutter speed can be detected from said indication. Next, by pressing down the shutter release, the power source switch 10 becomes "on", then the switch 11 is placed in "on" state thus the exposure meter circuit is short-circuited. By further pressing down of the release the shutter starting switch 5 is placed in "off" state, and as soon as the shutter is opened the capacitor 3 is charged through the light receiving element 2. When the terminal voltage of the capacitor 3 reaches standard value the switching circuit 8 is reversed and the shutter closing member is activated by the electro-magnet 9 to close the shutter. To bring the shutter speed which is indicated by the ammeter to a desired value, the amount of light received by the light receiving element 2 may be varied by the diaphragm ring 4, thereby the camera can be used as a shutter preference camera.

Next, when a synchronized flash photographing is done using an ordinary electronic flashing device, the linked switches 7, 14 and 16 are changed over by the change over ring (not shown in the drawing) of the camera for auto photographing flash photographing. That is the switch 16 is "on" and the switch 14 is connected to the side "b" while the switch 7 is connected to both contacts a' and b'. In this state, film sensitivity and guide number are set at the variable resistor 15 of the exposure meter circuit, and the distance information to an object is set at the variable resistor 18. When an ordinary flashing device is used, the switch 17 becomes "on", and such current as corresponding to distance flows to the exposure meter circuit and the pointer of the ammeter 12 is made to swing. Next, as the shutter release is pressed down, the pointer of the exposure meter 12 is clamped by the diaphragm control means (not shown in the drawing) such as conventionally known clamp plates, saw teeth, etc., and the angle ot its swing is identified and thus such a diaphragm value as corresponding to the angle of swing can be obtained. As the shutter release is further pressed down, the power source switch 10 is closed and the switch 14 is closed, thus short-circuiting the exposure meter circuit. As the shutter release is still further pressed down, a shutter which is not shown in the drawing is opened and as the start switch 5 is opened in synchronism with the opening of the shutter, the capacitor 3 of the time constant circuit is charged through the resistor 6 and the light receiving element 2. As an object is dark when photographing is done only by an ordinary flash light the resistance value of the light receiving element 2 is quite high as compared to the resistor 6, therefore the shutter speed becomes almost such constant speed (1/30 through 1/60) as determined by the time constant factor of the resistor 6 and the capacitor 3, and after an elapse of a predetermined length of time, the switching circuit 8 and the electro-magnet 9 are activated. And in the case of such photographing that natural light and flash light are simultaneously used the current passing through the light receiving element 2 becomes much and the capacitor is charged both by the current passing through the light receiving element 2 and the one passing through the resistor 6.

That is when it is bright, the shutter speed is determined by the circuit of the light receiving element 2 and when it is dark, the shutter speed is determined by the circuit of the resistor 7. In the case of such photographing that both natural light and flash light are simultaneously used, the compensating resistor 13 comes in series with the exposure meter circuit by the switch 14, and the swing of the pointer of the ammeter is automatically varied to such value as being stopped down by 0.5 to one step from the diaphragm value automatically determined by the guide number and the shooting distance.

Next, when flash photographing is done using a single-purpose electronic flashing device which outputs such signal as corresponding to the amount of illumination, the control signal from the electronic flashing device is given to the terminals X, Y to place the switch 17 in "off" state. Other switches work in the same manner as in the case of an ordinary electronic flashing device. In this state control signal of a wave form as shown in the drawings is given to the terminals X, Y. Until such time that a power source switch (not shown in drawing) for electronic flashing is placed in "on" state and the neon lamp of its charging indication circuit is lighted, $E_V$ is added to the ammeter circuit therefore the ammeter 12 does not swing. As the neon lamp is lighted, the voltage between X and Y drops from $E_V$ down to $E_{AV}$ and the pointer of the ammeter 12 swings in such a manner as corresponding to the setting resistor 15 of the circuit and to the resistance value of 18. From the lighting of the lamp till the full charge, the angle of swing of the ammeter varies by such a control signal as corresponding to the voltage of the main capacitor of the electronic flashing device so that a diaphragm value which always assures optimum exposure value can be secured. Therefore, if the indication of the ammeter is so made as to be shown within the field of vision of the finder, the state of the electronic flashing device can be always detected. As the pointer of the exposure meter 12 swings in such manner as mentioned above, the subsequent functions will be same as in the ordinary electronic flashing device previously explained, therefore, these explanations are omitted. While in automatic photographing with natural light, the diaphragm device 4 provided in front of the light receiving element is set at such a diaphragm diameter as corresponding to the diaphragm value set at an object lens; in flash photographing, the diameter is made to its maximum or minimum as soon as the switch 7 is changed over and as the diaphragm diameter of the object lens is automatically controlled by the swing angle of the exposure meter 12, the diaphragm diameter may be so varied as corresponding to said diaphragm diameter of the object lens. The diaphragm control device such as a clamp plate, saw teeth, etc. is so made as not functioning in the natural light photographing.

Figure 2:
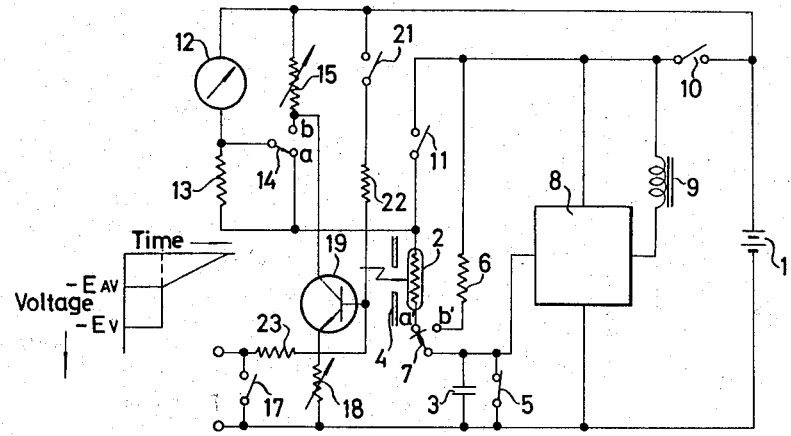
FIG. 2 is a circuit diagram showing the second example.

FIG. 2 is a circuit connection diagram showing the second embodiment of the present invention, wherein the same elements as in FIG. 1 are shown with the same numbers or marks. In the drawing, 19 is a transistor performing switching function, 20 is a variable resistor linked with a distance adjusting ring, and 21 is a switch which becomes "on" in flash photographing, while 22 and 23 are bleeder resistors. The circuit in the drawings is so made that it functions even when the control signal of the single-purpose electronic flashing device is small while the other circuit arrangements are same as in the circuit shown in FIG. 1. That is, the function in th case of automatic photographing with natural light is same as in FIG. 1, and in the case of flash photographing using an ordinary electronic flashing device, the switch 21 becomes "on" and the switch 17 becomes also "on", therefore the transistor 19 becomes conductive while other functions are same as in the circuit of FIG. 1. When a single-purpose electronic flash device is used, the switch 21 becomes "on" and the switch 17 becomes "off" and such control signal as shown in the drawings is given between the terminals X, Y. While $E_V$ is being given to the base of the transistor 19 and the transistor is in "off" state until the neon lamp (not shown in the drawing) for indicating charging of the electronic flash device is lighted, when the neon lamp is lighted said control voltage goes up to $E_V$ turning the transistor 19 to "on".

Thereby current flows through the circuit in series of the output resistance values of the distance setting resistance 18 and the transistor 19 and to the exposure meter circuit, and the charging information of the electronic flash device is led into the swing of the ammeter 12. As the functions of the other circuits are same as in the circuit of FIG. 1, their explanations are omitted.

Figure 3:
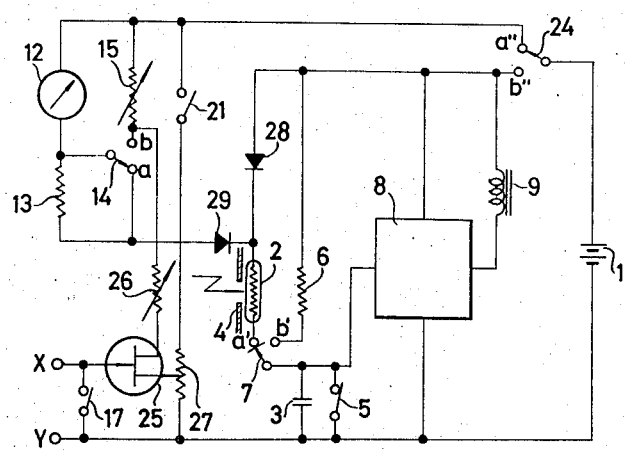
FIG. 3 is a circuit diagram showing the third example.

FIG. 3 is a circuit connection diagram showing another embodiment of the present invention, wherein the power source switch is of change over type to omit the short-circuiting switch 11 of the exposure meter circuit, and the control signal of the single-purpose electronic flash device is switched using a field effective transistor (FET). In this drawing also the same elements as in FIG. 1 are shown with the same numbers and marks. In the drawing, 24 is a power source change over switch and is changed over from $a''$ to $b''$ by pressing down of a shutter release. 25 is a field effective transistor (FET), 26 is a variable resistor linked with a distance ring, 27 is a variable resistor for adjusting the activating point of the FET, and 28 and 29 are diodes for preventing reverse current. The function of this circuit is almost same as in the examples shown in FIG. 1 and FIG. 2 therefore explanations are omitted, but the activating point of the FET is so made that the variable resistor 27 is adjusted to make it "off" before the neon lamp is lighted and make it "on" by the lighting of the same.

As has been explained above in the electronic shutter camera of the present invention an exposure meter circuit is provided, wherein not only the shutter speed of EE photographing can be known beforehand by the indication of the ammeter of said circuit, but also an optimum diaphragm value corresponding to the distance in flash photographing can be automatically determined by the swing angle of the ammeter, and also the compensation of the amount of exposure in a daytime synchronized photographing can be automatically made, thus the present invention has such advantages that flash photographing can be done in a same easy manner as that in an ordinary EE photographing.

What is claimed is:

1. A camera shutter control, comprising photoelectric means, diaphragm means for controlling the light sensed by said photoelectric means, control means responsive to said photoelectric means for controlling the time during which the camera shutter is open, indicator means coupled to said photoelectric means for establishing the opening of said diaphragm means on the basis of light sensed by said photoelectric means, shunt means, resistance means variable according to the distance of an object from the camera, and switch means coupled to said setting means and said shunt means as well as said resistance means for connecting sid shunt means across said setting means and said resistance means to said setting means so that said setting means responds to said shunt means and said resistance means.

2. A control as in claim 1, further comprising second resistance means coupled to said control means by said switch means during flash operation for establishing with said photoelectric means the time during which the control means opens the shutter.

3. A control as in claim 1, further comprising isolating resistor means connecting siad indicator means to said photoelectric means, said isolating resistor means being short circuited by said switch means when the switch means is set for available light operation rather than flash operation.

4. In a camera having a shutter release for initiating and terminating an exposure interval of a scene being photographed and a diaphragm device for controlling the exposure intensity; an apparatus comprising a power source having poles, photoelectric means for varying an electric value in response to illumination of the scene to be photographed, a capacitor, coupling means for coupling said capacitor to said photoelectric means and said power source so as to charge the capacitor at a rate determined by the electric value varied by the photoelectric means, setting means coupled to the photoelectric means and one pole of said power source for establishing the opening of the diaphragm device, first switch means connected in parallel with the capacitor and openable by operation of the shutter release, second switch means being switchable into one position when the camera is to be operated for available light photography and a second position when the camera is to be operated with a flash, shunt-circuit forming means for forming a shunt-circuit across said setting means, said second switch means connecting said shunt-circuit forming means across said setting means when the camera is to be set for flash operation, and variable resistive means settable to a resistance corresponding to a distance to the scene, said second switch means connecting said resistive means to the other pole of the power source and connecting said setting means to said variable resistive means when said second switch means is in the second position, said second switch means connecting said photoelectric means to said setting means without said resistive means when said second switch means is in the first position.

5. An apparatus as in claim 4, wherein said shunt-circuit forming means includes a variable resistor for setting photographic information.

6. An apparatus as in claim 4, wherein said resistive means includes third switch means connected in a path with the other pole of the source.

7. An apparatus as in claim 6, wherein said third switch means includes terminals for connection to an electronic flash device producing a voltage proportional to the amount of illumination, said terminals being connected across said third switch means, said third switch means being opened to receive the voltage proportional to the illumination.

8. An apparatus as in claim 7, wherein said shunt-circuit forming means includes a variable resistor for setting photographic information.

* * * * *